US009516289B2

(12) United States Patent
Kojima

(10) Patent No.: US 9,516,289 B2
(45) Date of Patent: Dec. 6, 2016

(54) VIDEO IMAGE PROJECTION APPARATUS, VIDEO IMAGE PROJECTION METHOD, AND STORAGE MEDIUM

(71) Applicant: CANON KABUSHIKI KAISHA, Tokyo (JP)

(72) Inventor: Naoki Kojima, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/599,367

(22) Filed: Jan. 16, 2015

(65) Prior Publication Data

US 2015/0208047 A1 Jul. 23, 2015

(30) Foreign Application Priority Data

Jan. 20, 2014 (JP) ................................ 2014-007977

(51) Int. Cl.
*H04N 9/31* (2006.01)
*G06T 3/40* (2006.01)

(52) U.S. Cl.
CPC ............... *H04N 9/3185* (2013.01); *G06T 3/40* (2013.01); *H04N 9/3194* (2013.01)

(58) Field of Classification Search
CPC .. G03B 21/28; G03B 21/147; H04N 9/3179; H04N 9/3185; H04N 9/3188; H04N 9/3194
See application file for complete search history.

(56) References Cited

U.S. PATENT DOCUMENTS

2009/0207383 A1* 8/2009 Hirahara .................. H04N 5/74 353/69
2009/0323029 A1* 12/2009 Chen ...................... G03B 21/14 353/37
2012/0105813 A1* 5/2012 Todoroki ............ H04N 9/3194 353/69
2013/0169607 A1* 7/2013 Inukai ...................... G09G 5/10 345/207
2013/0194554 A1* 8/2013 Aruga .................. G03B 21/147 353/69

FOREIGN PATENT DOCUMENTS

JP 2011-050013 A 3/2011
JP 2013-064827 A 4/2013

* cited by examiner

*Primary Examiner* — Sultan Chowdhury
(74) *Attorney, Agent, or Firm* — Canon U.S.A., Inc. IP Division

(57) ABSTRACT

In a method for inhibiting an object contained in an image from becoming hard to be visually recognized when the image is divided and then projected in order to avoid an area on which a projected image is hard to be visually recognized, if, when an input image is to be divided by an unsuitable-for-projection area, a predetermined object exists at a position where the input image is divided, the position of division of the input image is changed to such a position that the object within an area corresponding to the unsuitable-for-projection area is not divided. Then, on areas that exclude the unsuitable-for-projection area, the divided input images are projected after being adjusted to sizes that match the areas.

10 Claims, 14 Drawing Sheets

FIG. 5A
| | COORDINATES OF FOUR POINTS |
|---|---|
| UNSUITABLE-FOR-PROJECTION AREA 1 | $S_1$ |
| UNSUITABLE-FOR-PROJECTION AREA 2 | $S_2$ |
| UNSUITABLE-FOR-PROJECTION AREA 3 | $S_3$ |
| ... | |
FIG. 5B
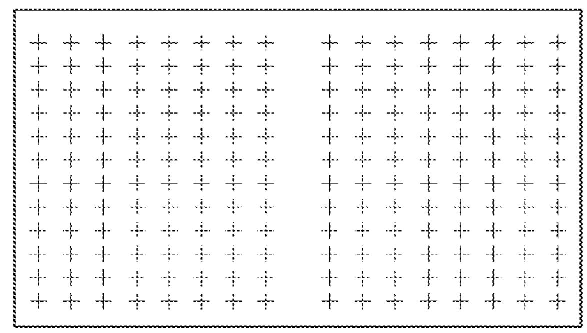
FIG. 5C
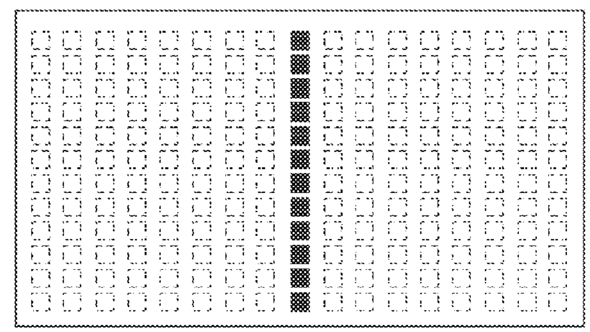
FIG. 5D
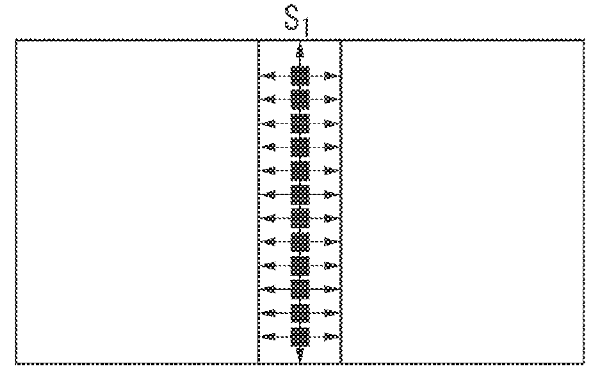

FIG. 6A
| | COORDINATES OF FOUR POINTS |
|---|---|
| CHARACTER POSITIONAL INFORMATION 1 | $M_1$ |
| CHARACTER POSITIONAL INFORMATION 2 | $M_2$ |
| CHARACTER POSITIONAL INFORMATION 3 | $M_3$ |
| ... | |
FIG. 6B
INPUT VIDEO IMAGE
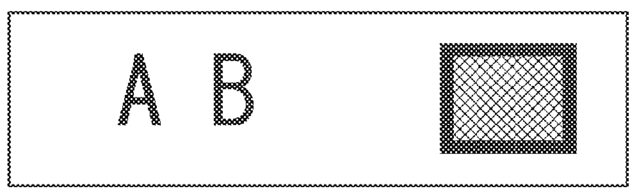
LAYOUT ANALYSIS
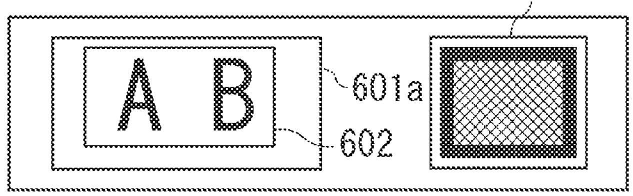
RESULTS OF CHARACTER POSITION DETECTION
603a 603b
$M_1$ $M_2$

| | PRE-TRANSFORMATION COORDINATES OF FOUR POINTS | POST-TRANSFORMATION COORDINATES OF FOUR POINTS |
|---|---|---|
| OPERATOR 1 | $H_{src1}$ | $H_{dst1}$ |
| OPERATOR 2 | $H_{src2}$ | $H_{dst2}$ |
| OPERATOR 3 | $H_{src3}$ | $H_{dst3}$ |
| ... | | |

VIDEO IMAGE PROJECTION APPARATUS, VIDEO IMAGE PROJECTION METHOD, AND STORAGE MEDIUM

BACKGROUND OF THE INVENTION

1. Field of the Invention

The present invention relates to a video image projection apparatus, a video image projection method, and a storage medium, and particularly to those suitable for use for projection of a video image.

2. Description of the Related Art

Video image projection apparatuses are capable of projecting images on a wall of a meeting room or the like even in an environment where a projection screen is not available. Therefore, using a video image projection apparatus, images projected on an area other than a projection screen can be viewed. Viewing images projected on an area other than a projection screen in this manner is becoming a common use case of video image projection apparatuses.

However, unlike dedicated projection screens, walls do not always have a flat projection area without a joint seam. For example, let it assumed that a wall is formed by plasterboards placed and fixed side by side. On this wall, the joints between the plasterboards form gaps. Therefore, there is a problem that if a character in an image is projected on such a joint area, the projected character is hard to be recognized.

To deal with this problem, Japanese Patent Application Laid-Open No. 2011-50013 and Japanese Patent Application Laid-Open No. 2013-64827 describe that an area where a projected image becomes missing is detected and the image is divided or reduced in size so as to avoid the area.

However, in the technologies described in the foregoing two laid-open patent applications, all input images are divided about an area unsuitable for projection and are then projected. Therefore, the technologies have a drawback that, if a to-be-divided region of an image contains a character, the projected character will be divided into left and right portions or upper and lower portions on opposite sides of an area unsuitable for projection. A similar drawback also occurs in the case where a dividing region of an image has a certain object other than characters.

SUMMARY OF THE INVENTION

According to an aspect of the present invention, an image processing apparatus includes a detecting unit configured to detect an object from an input image, an identification unit configured to identify, in an image projection range in which an image projection unit projects an image, a non-object area on which the image projection unit is not caused to project the object, and a transformation unit configured to transform the input image so that the image projection unit does not project the object on the non-object area and that the object is not divided by the non-object area.

Further features of the present invention will become apparent from the following description of exemplary embodiments with reference to the attached drawings.

BRIEF DESCRIPTION OF THE DRAWINGS

FIGS. 5A to 5D illustrate unsuitable-for-projection areas.

FIGS. 6A and 6B illustrate character positional information.

DESCRIPTION OF THE EMBODIMENTS

Various exemplary embodiments, features, and aspects of the invention will be described in detail below with reference to the drawings.

Figure 1:
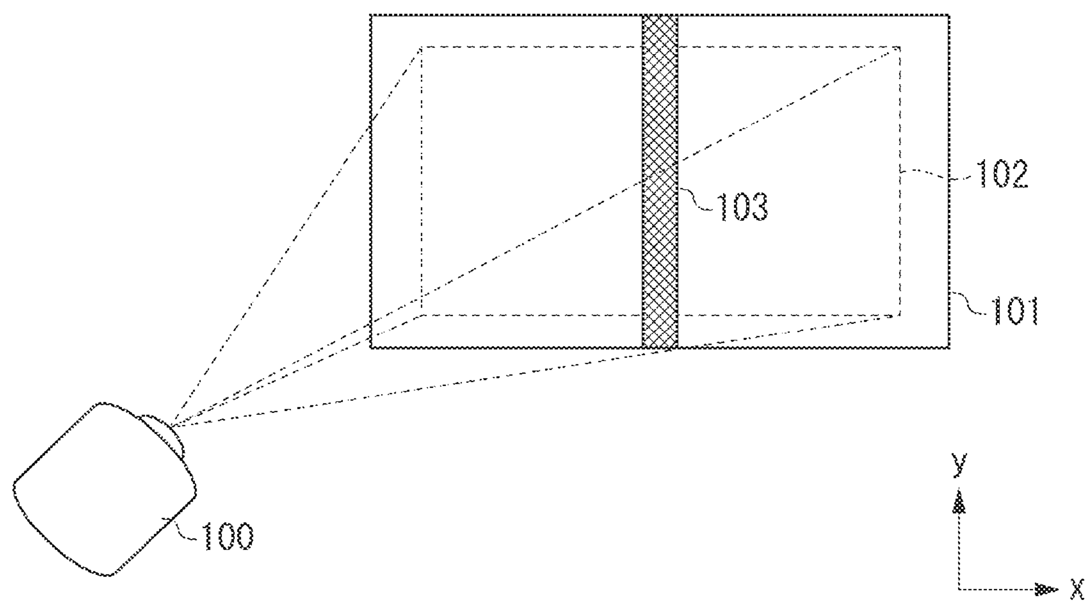
FIG. 1 illustrates a relation between a video image projection apparatus and a projection surface.

FIG. 1 illustrates an example of a relation between a video image projection apparatus 100 and a projection surface 101. FIGS. 2A to 2E illustrate examples of images to be viewed and states in which the images are projected on the projection surface 101 (video images projected on the projection surface 101 on the basis of the images to be viewed).

Referring to FIG. 1, in the projection surface 101, a projection area 102 is an area on which the video image projection apparatus 100 projects images. The projection surface 101, as indicated by hatching, has an unsuitable-for-projection area 103 that is an area not suitable for projection. The unsuitable-for-projection area 103 refers to, for example, an area in which the reflectance of projected light is conspicuously low or an area that has a gap or step due to a joint or the like between boards or panels that form the projection surface 101. The unsuitable-for-projection area 103 can also be expressed as a non-object area in which an object image should not be projected.

Figure 2A:
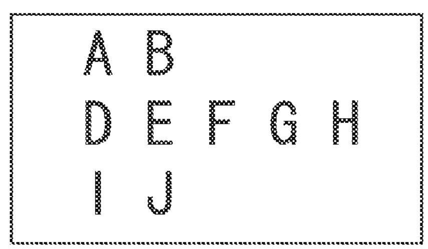
FIGS. 2A to 2E illustrate images to be viewed and states in which the images are projected on a projection surface.
Figure 2B:
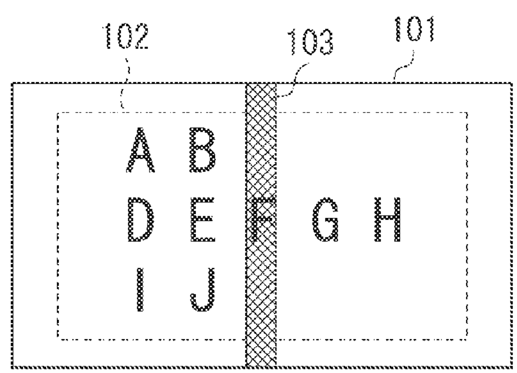

FIG. 2A illustrates an example of an image input to the video image projection apparatus 100. FIG. 2B illustrates an example of a state of a video image projected on the projection surface 101 by the video image projection apparatus 100.

In the example illustrated in FIG. 2B, a portion of character "F" is projected in the unsuitable-for-projection area 103, so that the character is hard to be visually recognized.

Figure 2C:
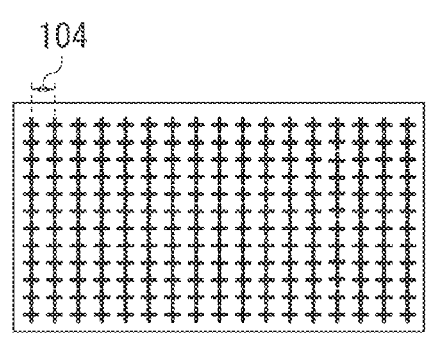
Figure 2D:
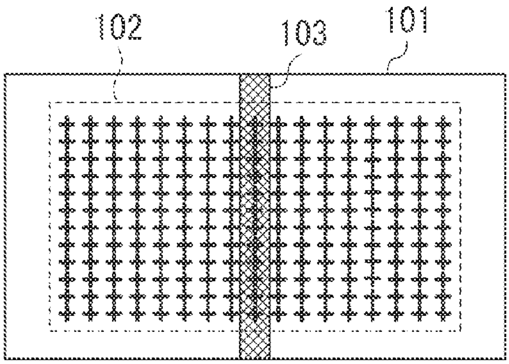
Figure 2E:
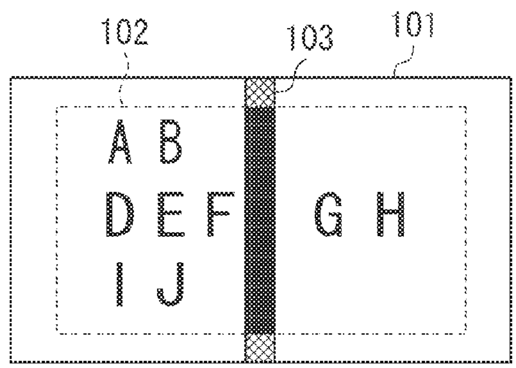

FIG. 2C illustrates an example of a pattern image for detecting the unsuitable-for-projection area 103. FIG. 2D illustrates an example of a state of the pattern image projected on the projection surface 101 by the video image projection apparatus 100. FIG. 2E illustrates an example of a state of a video image that is projected on the projection surface 101 by the video image projection apparatus 100 after the input image that contains character images is transformed so as to avoid being projected on the unsuitable-for-projection area 103 with any one of character images divided into left and right portions.

Figure 3:
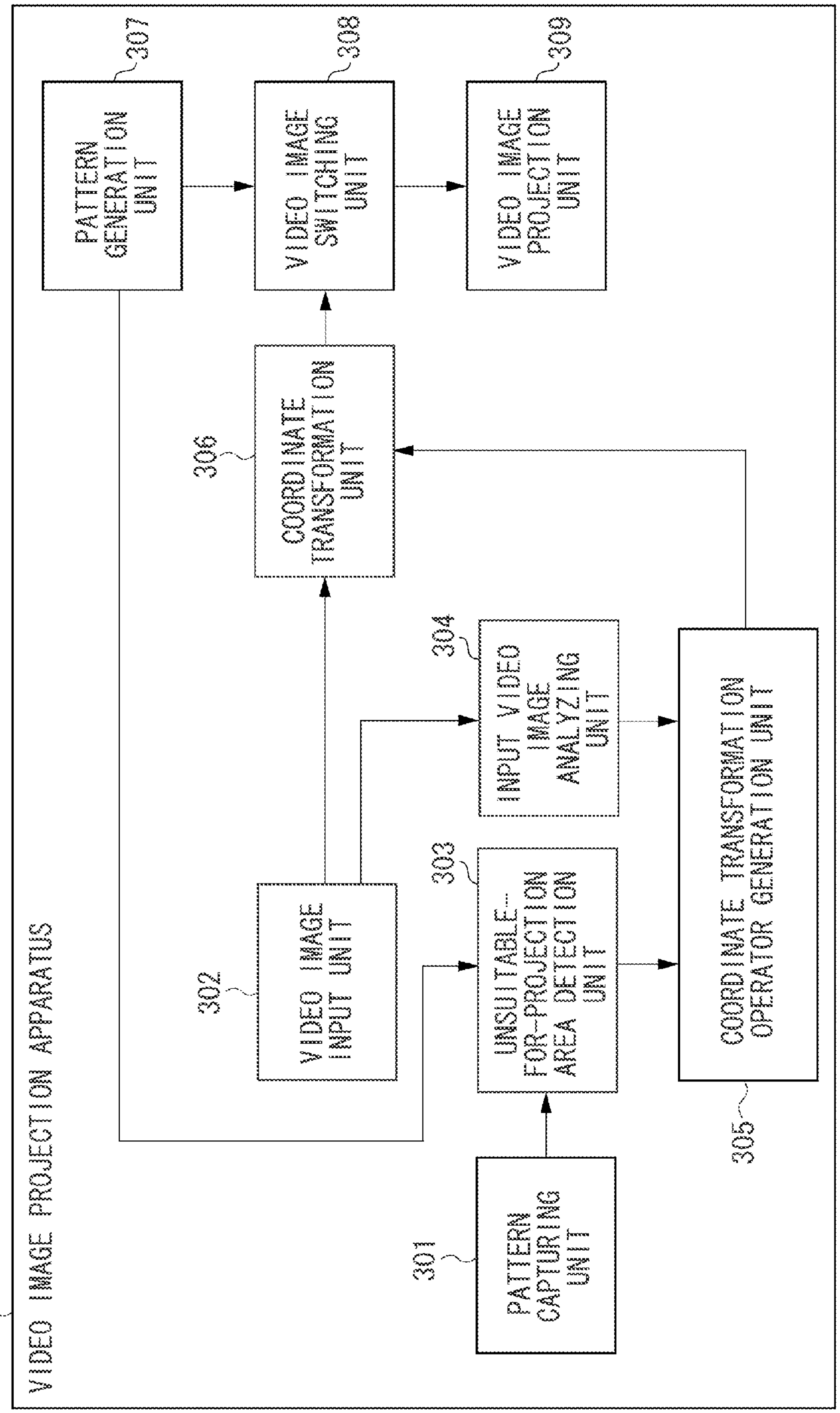
FIG. 3 illustrates a configuration of a video image projection apparatus.

In order to realize generation and projection of the video image as illustrated in FIG. 2E, the video image projection apparatus 100 of the present exemplary embodiment is configured as shown in a block diagram in FIG. 3. Firstly, various units illustrated in FIG. 3 will be briefly described.

The video image projection apparatus 100 has a pattern capturing unit 301, a video image input unit 302, an unsuitable-for-projection area detection unit 303, an input video image analyzing unit 304, a coordinate transformation operator generation unit 305, a coordinate transformation unit 306, a pattern generation unit 307, a video image switching unit 308, and a video image projection unit 309.

The video image input unit 302 inputs an image. The video image input unit 302 inputs an image, for example, by reading out an image from a portable type storage medium or taking in an image sent from an external apparatus. In the following description, an image input to the video image input unit 302 will be termed an input image as needed.

The pattern generation unit 307 generates a pattern image. The coordinate transformation unit 306 transforms the input image. The video image switching unit 308 selects one of an image transformed by the coordinate transformation unit 306 and a pattern image generated by the pattern generation unit 307. The video image projection unit 309 outputs the image selected by the video image switching unit 308 to a display element, so that a video image is projected on the projection surface 101.

The pattern capturing unit 301 captures the pattern image projected on the projection surface 101. The unsuitable-for-projection area detection unit 303 detects the unsuitable-for-projection area 103 from the pattern image captured by the pattern capturing unit 301. The input video image analyzing unit 304 detects the position of a character image contained in the input image. The coordinate transformation operator generation unit 305 generates a coordinate transformation operator.

Next, the various units illustrated in FIG. 3 will be described in detail.

The pattern generation unit 307 generates a pattern image for detecting an unsuitable-for-projection area. In this exemplary embodiment, the pattern image is an image in which a plurality of cross-shaped patterns is arranged equidistantly in a two-dimensional matrix form (equidistantly in up-down directions (vertical directions) and left-right directions (lateral directions)) as illustrated in FIG. 2C. The video image projection unit 309 projects the pattern image on the projection surface 101 as illustrated in FIG. 2D. The pattern generation unit 307 generates coordinate information (positional information) regarding each pattern in the pattern image captured by the pattern capturing unit 301. Such coordinate information is used by the unsuitable-for-projection area detection unit 303 described below.

Figure 4:
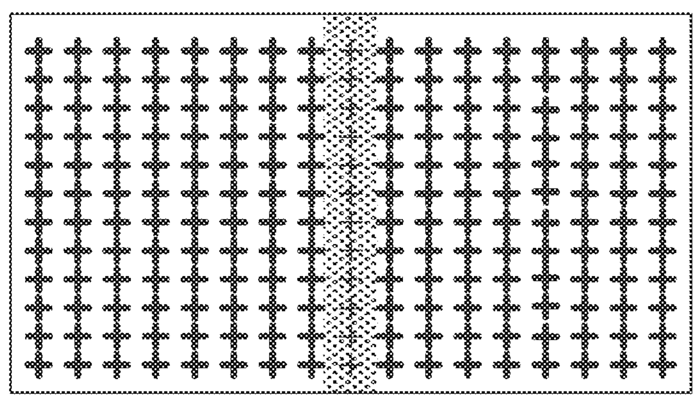
FIG. 4 illustrates a pattern image.

The pattern capturing unit 301 captures a pattern image as illustrated in FIG. 2C that the video image projection unit 309 projects. FIG. 4 illustrates an example of the pattern image captured by the pattern capturing unit 301. If the unsuitable-for-projection area is an area of low reflectance, the patterns projected on the unsuitable-for-projection area form an unclear image such as a hatched portion at the center in FIG. 4, which is captured by the pattern capturing unit 301.

The unsuitable-for-projection area detection unit 303 detects an unsuitable-for-projection area from the pattern image captured by the pattern capturing unit 301.

FIGS. 5A to 5D illustrate examples of unsuitable-for-projection areas. FIG. 5A illustrates an example of a table in which the coordinates of unsuitable-for-projection areas are stored. FIG. 5B illustrates an example of patterns extracted from a pattern image. FIG. 5C illustrates an example of patterns clearly captured and patterns not clearly captured. FIG. 5D illustrates an example of an unsuitable-for-projection area.

If an unsuitable-for-projection area is a rectangular area, the coordinates S of the unsuitable-for-projection area={(x0, y0), (x1, y1), (x2, y2), (x3, y3)} are the coordinates of the four points that are the vertices of the unsuitable-for-projection area (rectangular area). As illustrated in FIG. 5A, the unsuitable-for-projection area detection unit 303 is capable of detecting the coordinates $S_1$, $S_2$, and $S_3$ of a plurality of unsuitable-for-projection areas from a pattern image. The unsuitable-for-projection area detection unit 303 is capable of detecting an unsuitable-for-projection area by, for example, extracting patterns from a captured pattern image by applying a known binarizing process, a known fine-line detection process, etc. to the captured pattern image. The extracted patterns appear, for example, as illustrated in FIG. 5B.

The unsuitable-for-projection area detection unit 303 compares the extracted patterns with the individual patterns acquired from the pattern generation unit 307 in terms of coordinate information (positional information) to find at which positions patterns fail to be extracted, that is, which patterns are not clearly captured. In the example illustrated in FIG. 5B, the patterns indicated by black solid rectangles in FIG. 5C are not clearly captured.

Finally, the unsuitable-for-projection area detection unit 303 determines that a certain area whose starting point is a position of the patterns that are not clearly captured is an unsuitable-for-projection area. Determining the positions of the not-clearly-captured patterns (black solid rectangles in FIG. 5C) leads to determine the unsuitable-for-projection area, for example, as follows. That is, a rectangular area whose long sides extend through positions that are apart in the left-right directions by half the distance between adjacent patterns in the left-right directions (distance 104 indicated in FIG. 2C) and whose short sides are portions of the upper and lower edges of the pattern image can be determined as the unsuitable-for projection area.

Incidentally, in the case where the pattern image captured by the pattern capturing unit 301 is distorted, the unsuitable-for-projection area detection unit 303 can also appropriately determine an unsuitable-for-projection area by performing processing as follows, before extracting patterns from the captured pattern image. That is, if the captured pattern image is subjected to a distortion correction and a size adjustment by using coordinate information about the patterns in the four corners of the captured pattern image, the unsuitable-for-projection area can be appropriately determined.

The input video image analyzing unit 304 analyzes an input image, and outputs coordinate information regarding areas determined as being characters (character positional information) to the coordinate transformation operator generation unit 305.

FIGS. 6A and 6B illustrate examples of character positional information. FIG. 6A illustrates an example of a table in which character positional information is stored. FIG. 6B illustrates an example of a method for detecting character positional information.

In FIG. 6A, character positional information M={(x0, y0), (x1, y1), (x2, y2), (x3, y3)} is made up of the coordinates of four points that are the vertices of a rectangular area that is assumed to be the area of a character. As indicated in FIG. 6A, the input video image analyzing unit 304 is capable of detecting a plurality of pieces of character positional information $M_1$, $M_2$, and $M_3$ from one video image. In the example illustrated in FIGS. 6A and 6B, each piece of character positional information is information about one character. For the analysis of an image, use of a known technology, for example, a layout analysis process or the like that is commonly used in optical character recognition (OCR) or the like, will suffice.

A concrete example of such an image analysis method can be described as follows. Firstly, the input video image analyzing unit 304 extracts blocks 601*a* and 601*b* from an input image as shown in FIG. 6B. Next, the input video image analyzing unit 304 extracts a character string area 602 from the extracted blocks 601*a* and 601*b*. Then, the input video image analyzing unit 304 clips characters 603*a* and 603*b* out of the extracted character string area 602. Finally, the input video image analyzing unit 304 obtains positional information (coordinates) entirely about the areas of the clipped characters 603*a* and 603*b* as character positional information.

Incidentally, character positional information may be embedded as meta data in an input image beforehand, and the character positional information may be used by the coordinate transformation operator generation unit 305. Furthermore, an object detected from an input image is not limited to a character. The input video image analyzing unit 304 may also detect an object other than a character, for example, a human body or a graphic in addition to or instead of the character.

Referring back to FIG. 3, the coordinate transformation operator generation unit 305 generates a coordinate transformation operator for an input image by using the unsuitable-for-projection area obtained by the unsuitable-for-projection area detection unit 303 and the character positional information obtained by the input video image analyzing unit 304. Firstly, the definition of the coordinate transformation operator in the present exemplary embodiment will be described. Then, how to obtain the coordinate transformation operator by using the unsuitable-for-projection area and the character positional information will be described.

Although various operators are conceivable as the coordinate transformation operator, the coordinate transformation operator in the present exemplary embodiment is an operator for realizing a plurality of four-point-specified transformations. The four-point-specified transformation is a technology commonly used in a trapezoidal correction in projectors, or the like, to transform the coordinates of points at four corners of a pre-transformation image by an arbitrary geometric transformation (e.g., projective transformation).

Figures 7A, 7B:
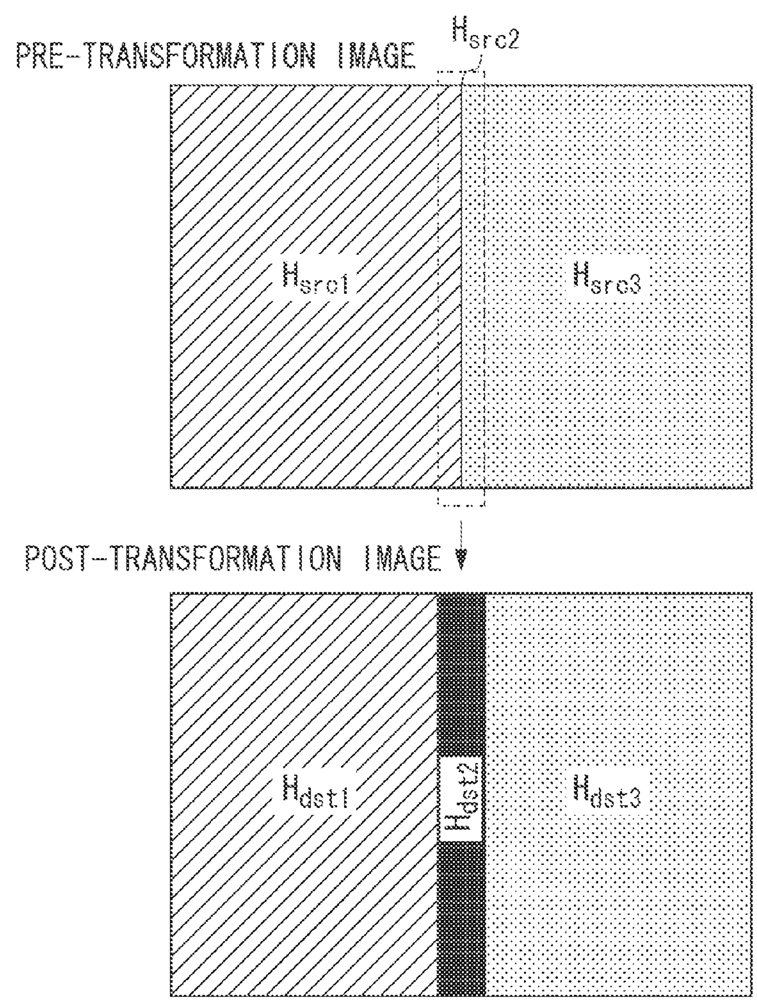
FIGS. 7A and 7B illustrate coordinate transformation operators.

FIGS. 7A and 7B illustrate examples of a coordinate transformation operator (a four-point-specified transformation operator) that is obtained by the coordinate transformation operator generation unit 305. FIG. 7A illustrates an example of a table in which coordinate transformation operators are stored. FIG. 7B illustrates an example of an image before being transformed by the four-point-specified transformation and an image after being transformed by the four-point-specified transformation.

In FIG. 7A, each coordinate transformation operator is made up of a set of coordinates $H_{scr}$ of the points at the four corners of a rectangle before being transformed and a set of coordinates $H_{dst}$ of the points at the four corners of the rectangle after being transformed. In the example illustrated in FIG. 7B, three coordinate transformation operators exist. An operator 1 in FIG. 7A is made up of a set of coordinates $H_{scr1}$ of the points at the pre-transformation four corners of a rectangle disposed to the left side of a line segment that divides an input image, and a set of coordinates $H_{dst1}$ of the points at the post-transformation four corners of the rectangle. Similarly, an operator 2 in FIG. 7A is made up of a set of coordinates $H_{src2}$ of the points at the pre-transformation four corners of the line segment that divides the input image, and a set of coordinates $H_{dst2}$ of the points at the post-transformation four corners of the line segment. Furthermore, an operator 3 in FIG. 7A is made up of a set of coordinates $H_{scr3}$ of the points at the pre-transformation four corners of a rectangle disposed to the right side of the line segment that divides the input image, and a set of coordinates $H_{dst3}$ of the points at the post-transformation four corners of the rectangle. Incidentally, of the pre-transformation coordinates of four-corner points of the line segment, the coordinates of the upper right corner point and the coordinates of the upper left corner point are the same, and the coordinates of the lower right corner point and the coordinates of the lower left corner point are the same As illustrated in FIGS. 7A and 7B, a plurality of coordinate transformation operators exists for one input image. The coordinate transformation operator generation unit 305 generates a plurality of coordinate transformation operators such that rectangles formed by the sets of coordinates $H_{dst}$ of the post-transformation four-corner points entirely cover the post-transformation image without a missing part, and do not overlap each other. Furthermore, in FIG. 7B, the configuration formed by the set of coordinates $H_{src2}$ of the pre-transformation four-corner points is a line segment. In the case of transformation of a line segment, the image of the pre-transformation line segment is changed into an image made up of black pixels. That is, the rectangle formed by the set of coordinates $H_{src2}$ of the pre-transformation four-corner points turns into an area formed by black pixels.

Next, an example of a method in which the coordinate transformation operator generation unit 305 calculates a coordinate transformation operator defined as described above by using an unsuitable-for-projection area and character positional information will be described.

Figure 8A:
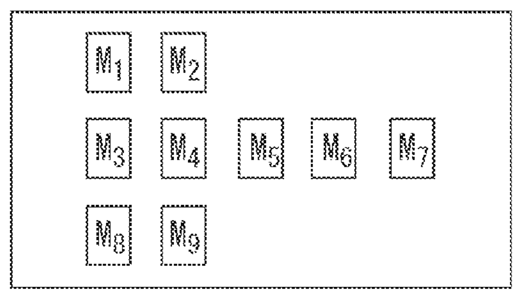
FIGS. 8A to 8D illustrate a first example of a generation method for coordinate transformation operators.
Figure 8B:
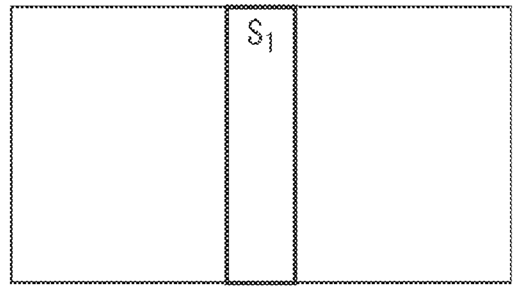
Figure 8C:
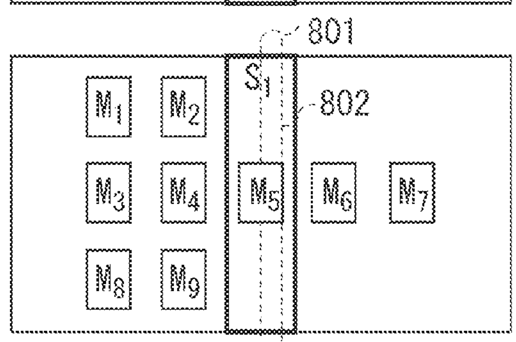
Figure 8D:
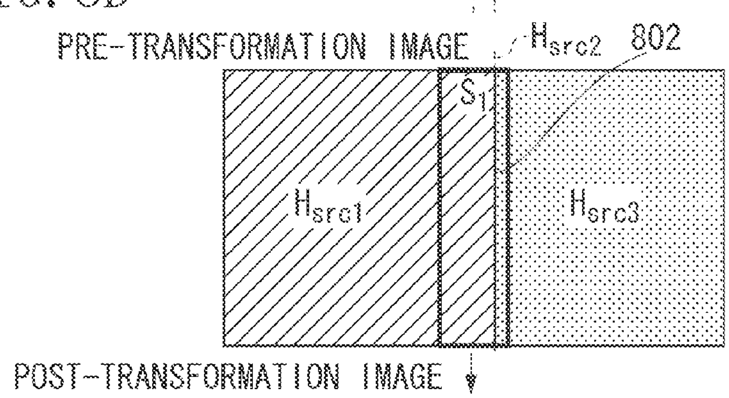
Figure 8D:
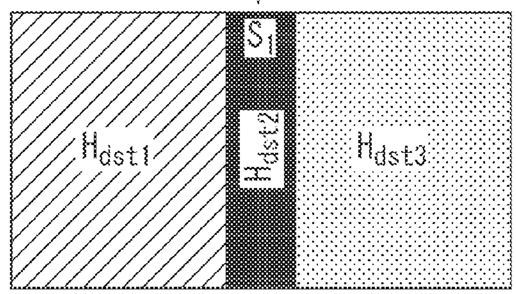

FIGS. 8A to 8D illustrate an example of a generation method for a coordinate transformation operator. Concretely, FIG. 8A conceptually illustrates an example of a result of the input video image analyzing unit 304 detecting the positions of characters in an input image. FIG. 8B conceptually illustrates an example of a result of the unsuitable-for-projection area detection unit 303 detecting an unsuitable-for-projection area. FIG. 8C illustrates the characters in the input image and the unsuitable-for-projection area, on which one of the characters is superimposed. FIG. 8D illustrates examples of a pre-transformation image and a post-transformation image on the basis of the four-point-specified transformation.

FIGS. 8A to 8D illustrate, as an example, the case where a coordinate transformation operator is calculated for a video image projected on the projection surface 101, as illustrated in FIG. 2B. Further, FIG. 8A illustrates, as an example, the case where nine pieces of character positional information $M_1$ to $M_9$ are detected. Furthermore, FIG. 8B illustrates, as an example, the case where one unsuitable-for-projection area (coordinates $S_1$) is detected.

Figure 9:
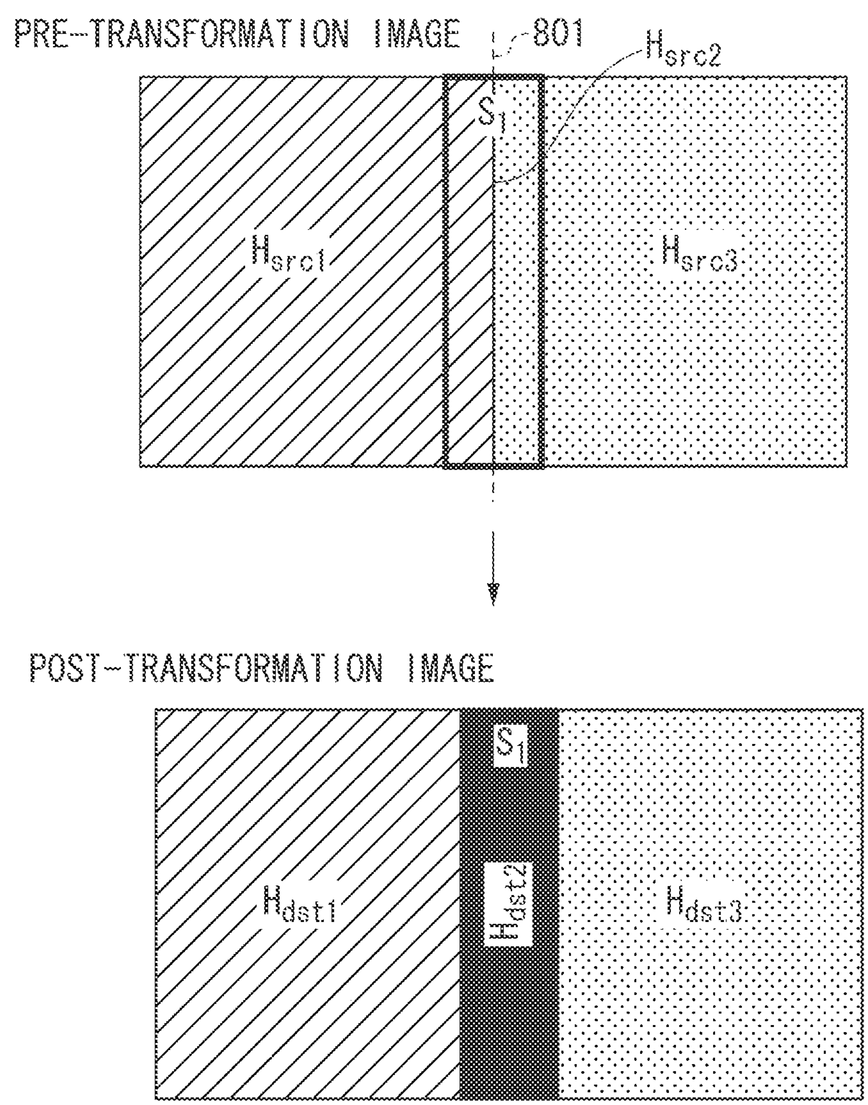
FIG. 9 illustrates a second example of the generation method for coordinate transformation operators.

If the input video image analyzing unit 304 does not detect character positional information, the coordinate transformation operator generation unit 305 obtains a coordinate transformation operator by using only the unsuitable-for-projection area having the coordinates $S_1$. FIG. 9 illustrates an example of the generation method for a coordinate transformation operator which is employed in the case where character positional information is not detected. Concretely, FIG. 9 illustrates examples of a pre-transformation image and a post-transformation image based on the four-point-specified transformation.

In FIG. 9, the coordinate transformation operator generation unit 305 divides a pre-transformation image into three areas, that is, a linear line segment 801 that divides equally in the left-right direction a rectangle that constitutes the unsuitable-for-projection area having the coordinates $S_1$, and two contiguous areas on both sides of the line segment 801. The sets of coordinates of the four-corner points of the individual divided areas are represented by $H_{src2}$, $H_{src1}$ and $H_{src3}$. The coordinate transformation operator generation unit 305 determines the set of coordinates $H_{dst2}$ of the four-corner points of a post-transformation central rectangle so that the unsuitable-for-projection area having the coordinates $S_1$ becomes a black area. The coordinate transformation operator generation unit 305 sets rectangles on the left and right sides of the rectangle defined by the set of coordinates $H_{dst2}$ of the four-corner points so that the image after being transformed will not have a missing part or an overlap. Then, the coordinate transformation operator generation unit 305 determines the sets of coordinates of the four-corner points of the individual rectangles set as described above, as the sets of coordinates $H_{dst1}$ and $H_{dst3}$ of the post-transformation left and right rectangles. As illustrated in FIG. 9, the three rectangles determined by the sets of coordinates $H_{dst1}$, $H_{dst2}$ and $H_{dst3}$ of the four-corner points of the individual rectangles after being transformed are arranged without a space left therebetween, and the total sum of the sizes of the three rectangles is equal to the size of the input image. That is, the size of the projection area of the post-transformation input image and the size of the projection area of the input image that would be obtained if the input image were projected without being transformed are equal.

Now, an example of a calculation method for a coordinate transformation operator in the case where the input video image analyzing unit 304 has detected character positional information will be described. In this case, if the coordinate transformation operators are obtained as illustrated in FIG. 9, an image of a character present in the unsuitable-for-projection area having the coordinates $S_1$ (a character indicated by the piece of character positional information $M_5$) is divided into left and right separate portions. That is, the character image present in the unsuitable-for-projection area having the coordinate $S_1$ is divided into portions that appear in two rectangles that are determined by the sets of coordinates $H_{dst1}$ and $H_{dst3}$ of the four-corner points of each of the post-transformation rectangles. This is because the rectangle (line segment) determined by the set of coordinates $H_{src2}$ of the pre-transformation four-corner points, when no character is detected in the unsuitable-for-projection area having the coordinates $S_1$, is the line segment that equally divides the unsuitable-for-projection area having the coordinates $S_1$ into left and right portions, and remains the same line when a character is detected in the unsuitable-for-projection area having the coordinate $S_1$.

Whether a character image is divided into left and right portions can be detected by determining whether a character identified by character positional information overlaps the line segment 801 that divides equally in the left-right direction the rectangle that constitutes the unsuitable-for-projection area having the coordinates $S_1$. Therefore, the coordinate transformation operator generation unit 305 firstly checks whether the line segment 801 and the position of a character identified by character positional information overlap each other by comparing the coordinates $S_1$ of the unsuitable-for-projection area successively with the pieces of character positional information $M_1$ to $M_9$. As a result, in the example illustrated in FIG. 8C, it is found that the character identified by the piece of character positional information $M_5$ overlaps the line segment 801.

The coordinate transformation operator generation unit 305 operates so that the piece of character positional information $M_5$ will be entirely contained in the set of coordinates $H_{src1}$ of the four-corner points of the rectangle disposed on the left side of the line segment that divides the input image. Concretely, the coordinate transformation operator generation unit 305 changes the values of the set of coordinates $H_{src2}$ of the pre-transformation four corner points of the line segment from the values of the coordinates of the line segment 801 to the values of the coordinates of a line segment 802 that extends linearly in the up-down direction on a right side end of the piece of character positional information $M_5$.

The coordinate transformation operator generation unit 305 enlarges the rectangular area formed by the set of coordinates $H_{src1}$ of the pre-transformation four corner points by the amount of enlargement caused by changing the values of the pre-transformation set of coordinates $H_{src2}$ (see the upper diagram in FIG. 8D). The set of coordinates of the area enlarged in this manner is set as the set of coordinates $H_{src1}$ of the pre-transformation four-corner points of the rectangle disposed on the left side of the line segment that divides the input image.

The coordinate transformation operator generation unit 305 sets the set of coordinates of the four-corner points of the remainder area of the pre-transformation image as the set of coordinates $H_{src3}$ of the pre-transformation four-corner points of the rectangle disposed on the right side of the line segment that divides the input image (see the upper diagram in FIG. 8D).

The sets of coordinates $H_{dst1}$, $H_{dst2}$, and $H_{dst3}$ of the post-transformation four-corner points may be the same as illustrated in FIG. 9.

That is, the coordinate transformation operator generation unit 305 firstly determines an area having the coordinates $H_{dst2}$ of the post-transformation four-corner points such that the unsuitable-for-projection area having the coordinates $S_1$ becomes a black area.

Next, the coordinate transformation operator generation unit 305 sets rectangles on the left and right sides of the rectangle determined by the set of coordinates $H_{dst2}$ of the post-transformation four-corner points so that the post-transformation image will not have a missing part or an overlap.

Then, the coordinate transformation operator generation unit 305 determines the sets of coordinates of the four-corner points of the left and right rectangles set as described above as the sets of coordinates $H_{dst1}$ and $H_{dst3}$ of the post-transformation four-corner points of the individual rectangles disposed on the left and right sides of the unsuitable-for-projection area. The coordinates $H_{dst2}$ of the post-transformation four-corner points of the line segment that divides the input image become to be the coordinates of the four-corner points of the unsuitable-for-projection area having the coordinates $S_1$. Therefore, the sets of coordinates $H_{dst1}$ and $H_{dst3}$ of the post-transformation four-corner points of the rectangles on the left and right sides of the unsuitable-for-projection area are those obtained by performing on the sets of coordinates $H_{src1}$ and $H_{src3}$ of the pre-transformation four-corner points a size-reducing transformation according to the size of the unsuitable-for-projection area having the coordinates $S_1$ and the position of the line segment 802.

Therefore, the images in the left and right rectangles obtained by dividing the input image by the line segment 802 (rectangles determined by the sets of coordinates $H_{src1}$ and $H_{src3}$) are reduced in size by amounts of areas extending from the line segment 802 to the left and right, respectively, in the unsuitable-for-projection area of the coordinates $S_1$.

As illustrated in FIG. 8D, the three rectangles determined by the sets of coordinates $H_{dst1}$, $H_{dst2}$, and $H_{dst3}$ of the post-transformation four-corner points are arranged so that there is neither space nor overlap between the rectangles, and the total sum of the sizes of the three rectangles is equal to the size of the input image.

The coordinate transformation operator generation unit 305 selects which one of the rectangle on the left side of the line segment 801 and the rectangle on the right side of the line segment 801 is to be enlarged based on the state of overlap between the line segment 801 and the character identified by the character positional information. A concrete example will be described. In the case where character positional information that overlaps the line segment 801 exists more to the left-side rectangle side of the line segment 801, the coordinate transformation operator generation unit 305 enlarges the rectangle on the left side of the line segment 801. On the other hand, in the case where character positional information that overlaps the line segment 801 exists more to the right-side rectangle side of the line segment 801, the coordinate transformation operator generation unit 305 enlarges the rectangle on the right side of the line segment 801.

Incidentally, in the example illustrated in FIG. 8C, since the line segment 801 is at the center of the character identified by character positional information, either one of the rectangle on the left side of the line segment 801 and the rectangle on the right side of the line segment 801 may be enlarged. FIG. 8C illustrates, as an example, the case where the rectangle on the left side of the line segment 801 is enlarged.

Furthermore, in the case where there is a plurality of pieces of character positional information overlapping the line segment 801, the coordinate transformation operator generation unit 305 moves the line segment 802 (the set of coordinates $H_{src2}$) in one of the two opposite directions such that the amount of movement from the line segment 801 is smaller.

Figure 10A:
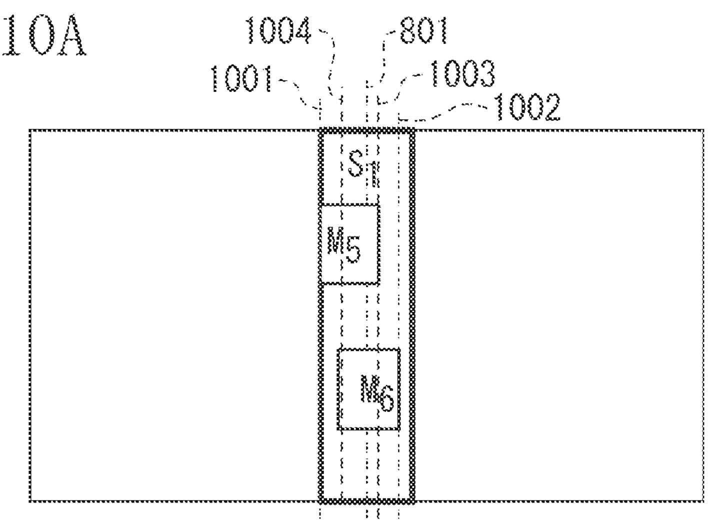
FIGS. 10A and 10B illustrate a third example of the generation method for coordinate transformation operators.
Figure 10B:
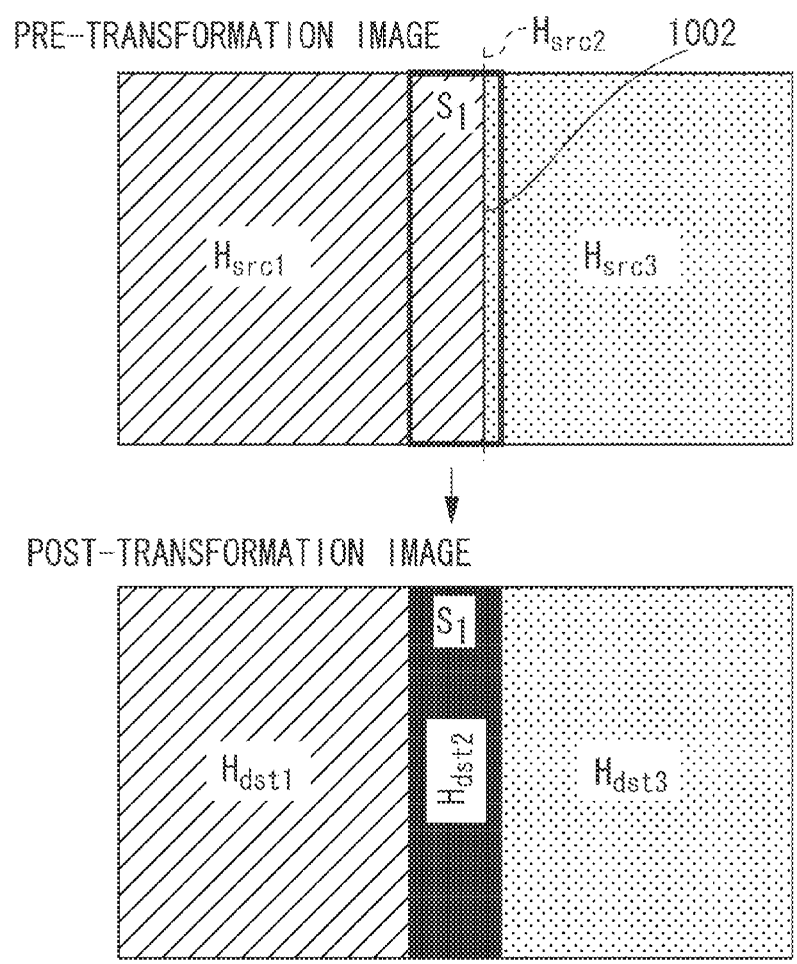

FIGS. 10A and 10B illustrate an example of the generation method for coordinate transformation operators in the case where the line segment that equally divides the input image into left and right portions overlaps a plurality of characters. Concretely, FIG. 10A illustrates characters in an input image and an unsuitable-for-projection area that are superimposed. FIG. 10B illustrates examples of a pre-transformation image and a post-transformation image based on the four-point-specified transformation.

In the example illustrated in FIG. 10A, the line segment 801 overlaps characters identified by pieces of character positional information $M_5$ and $M_6$. Candidate destinations to which the line segment 801 can move are a line segment 1001 that linearly extends in the up-down direction on a left end of the character identified by the piece of character positional information $M_5$ and a line segment 1002 that linearly extends in the up-down direction on a right end of the character identified by the piece of character positional information $M_6$. The coordinate transformation operator generation unit 305 selects, out of these line segments 1001 and 1002, the line segment 1002 that offers a smaller amount of movement with respect to the line segment 801 as the set of coordinates $H_{src2}$ of the pre-transformation four-corner points of the line segment that divides the input image. FIG. 10B illustrates an example of coordinate transformation operators in the case where the line segment 1002 is expressed by the set of coordinates $H_{src2}$ of the four-corner points of the pre-transformation line segment.

Let it assumed that either a line segment 1003 extending linearly in the up-down direction on the right side of the character identified by the piece of character positional information $M_5$ or a line segment 1004 extending linearly in the up-down direction on the left side of the character identified by the piece of character positional information $M_6$ is selected as the destination of the line segment 801. Then, overlap of the line segment with one of the characters identified by the pieces of character positional information $M_5$ and $M_6$ cannot be dissolved. Therefore, the line segments 1003 and 1004 are not set as the destination of the line segment 801.

Referring back to FIG. 3, the coordinate transformation unit 306 transforms the input image by using the coordinate transformation operators generated by the coordinate transformation operator generation unit 305. Concretely, the pixel values of coordinates in quadrangles represented by the set of coordinates $H_{dst1}$, $H_{dst2}$, and $H_{dst3}$ of the post-transformation four-corner points are obtained through the four-point-specified transformation by using the pixel values of coordinates in quadrangles represented by the sets of coordinates $H_{src1}$, $H_{src2}$, and $H_{src3}$ of the pre-transformation four-corner points. In the case where there is a plurality of coordinate transformation operators, the coordinate transformation unit 306 performs transformation of coordinates separately for each coordinate transformation operator. Incidentally, in the case where the configuration represented by the set of coordinates $H_{src2}$ of the pre-transformation four-corner points is a line segment, the coordinate transformation unit 306 sets the pixel values of coordinates in the quadrangle represented by the set of coordinates $H_{dst2}$ of the post-transformation four-corner points to a value that corresponds to black (pixel value=0 (zero)), and does not perform the four-point-specified transformation.

Now, with reference to flowcharts in FIGS. 11 and 12, examples of processes performed by the video image projection apparatus 100 of the present exemplary embodiment will be described.

Figure 11:
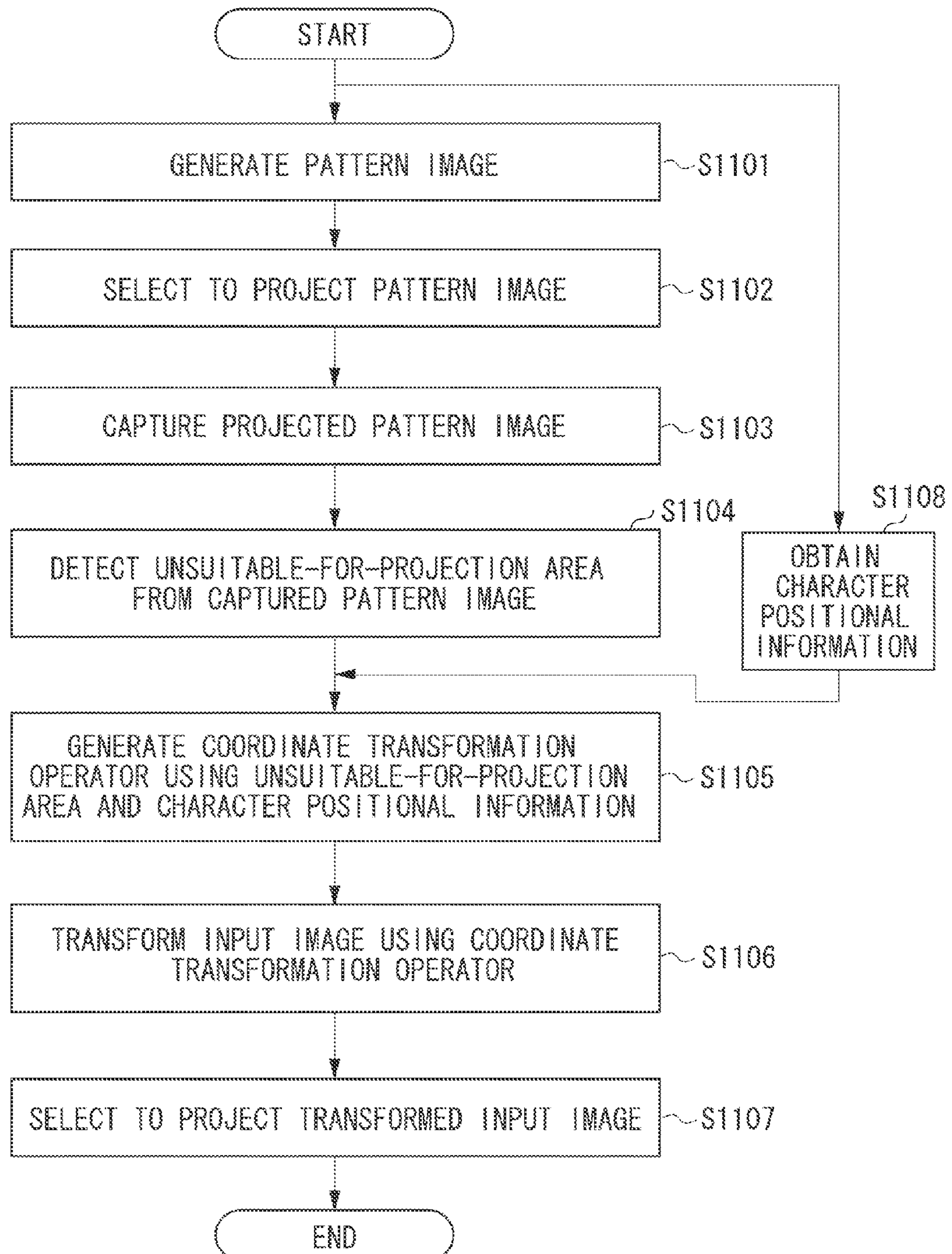
FIG. 11 is a flowchart illustrating a first example of processing performed by a video image projection apparatus.

The flowchart of FIG. 11 illustrates a process that is executed when the video image projection apparatus 100 is powered on, or when an installation location of the video image projection apparatus 100 has been changed. Furthermore, this process is also executed according to an instruction from a user, for example, when a wall surface environment has changed.

In step S1101, the pattern generation unit 307 generates a pattern image.

In step S1102, the video image switching unit 308 selects the pattern image generated in step S1101. As a result, the pattern image is projected from the video image projection unit 309 onto the projection surface 101.

In step S1103, the pattern capturing unit 301 captures the pattern image projected in step S1102, and thus obtains a captured image.

In step S1104, the unsuitable-for-projection area detection unit 303 detects the unsuitable-for-projection area 103 from the pattern image captured in step S1103.

Before step S1105, which will be described below, starts, the input video image analyzing unit 304 analyzes, in step S1108, an image input to the video image input unit 302 (input image) and obtains the positional information about character images contained in the input image (pieces of character positional information $M_1$, $M_2$, $M_3$, etc.). Then, in step S1105, the coordinate transformation operator generation unit 305 generates coordinate transformation operators by using the unsuitable-for-projection area 103 detected in step S1104 and the character positional information obtained in step S1108.

In step S1106, the coordinate transformation unit 306 transforms the input image by using the coordinate transformation operators generated in step S1105.

In step S1107, the video image switching unit 308 selects the input image transformed in step S1106. As a result, the input image transformed in step S1106 is projected from the video image projection unit 309 onto the projection surface 101.

Figure 12:
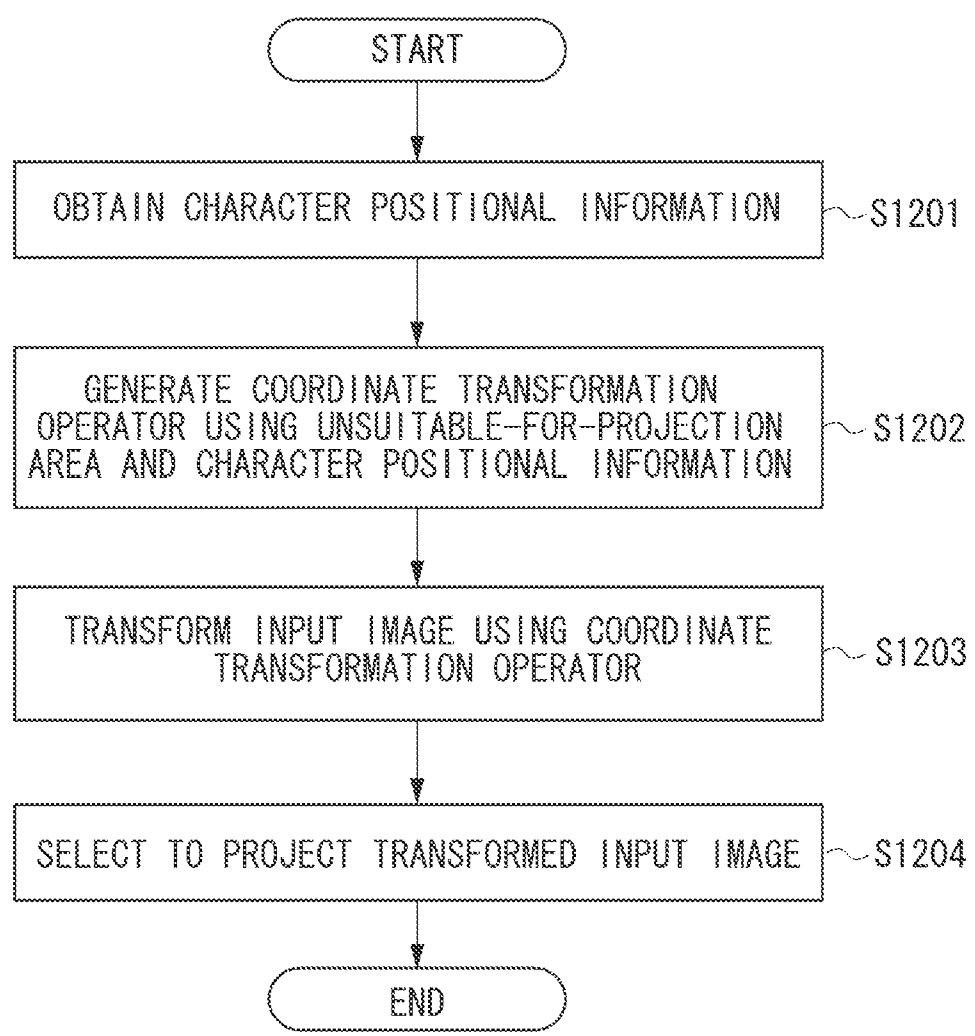
FIG. 12 is a flowchart illustrating a second example of processing performed by the video image projection apparatus.

The flowchart of FIG. 12 illustrates a process that is executed when an input image is changed to another. If an input image is changed to another, positions of character images and the like also change. However, the environment of the wall surface (projection surface 101) does not change (i.e., the unsuitable-for-projection area does not change). Therefore, the flowchart of FIG. 12 can be said to be a process executed when only the character positional information is to be updated.

In step S1201, the input video image analyzing unit 304 analyzes the input image, and obtains positional information (character positional information) about character images contained in the input image.

In step S1202, the coordinate transformation operator generation unit 305 generates coordinate transformation operators by using the unsuitable-for-projection area 103 already detected in step S1104 in FIG. 11 and the character positional information obtained in step S1201.

In step S1203, the coordinate transformation unit 306 transforms the input image by using the coordinate transformation operators generated in step S1202.

In step S1204, the video image switching unit 308 selects the input image transformed in step S1203. As a result, the input image transformed in step S1203 is projected from the video image projection unit 309 onto the projection surface 101.

Thus, in this exemplary embodiment, in the case where, when the input image is to be divided in the unsuitable-for-projection area 103, a predetermined object exists at a position of division, the position of division is changed to a position such that the object in the area that corresponds to the unsuitable-for-projection area 103 will not be divided. Then, onto the areas excluding the unsuitable-for-projection area 103, the divided input images are projected after being adjusted to sizes that match the areas. Therefore, it is possible to divide an input image and project the divided images so that the characters and specific objects will not be divided. Hence, it is possible to inhibit an object contained in an image from becoming hard to be visually recognized when the image is divided and then projected in order to avoid an area on which a projected image is hard to be visually recognized.

Figure 13:
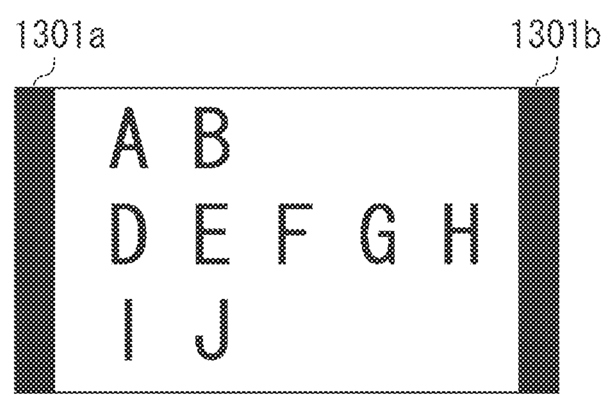
FIG. 13 illustrates another example of an input image.

An image to be input to the video image input unit 302 is not limited to the one as shown in FIG. 2A. FIG. 13 illustrates another example of an input image. In some cases, as illustrated in FIG. 13, black band areas 1301*a* and 1301*b* are always additionally provided on the right and left ends of an input image from the effect of retainment of the aspect ratio of the input image. In such a case, it suffices that the coordinate transformation operator generation unit 305 horizontally moves the quadrangles represented by the sets of coordinates $H_{src1}$ and $H_{src3}$ of the pre-transformation four-corner points without a need to enlarge the quadrangles.

Figure 14A:
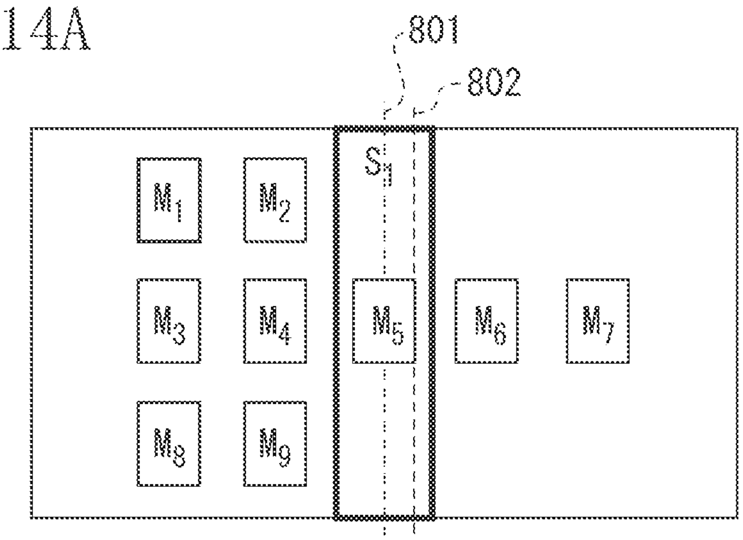
FIGS. 14A and 14B illustrate a fourth example of the generation method for coordinate transformation operators.
Figure 14B:
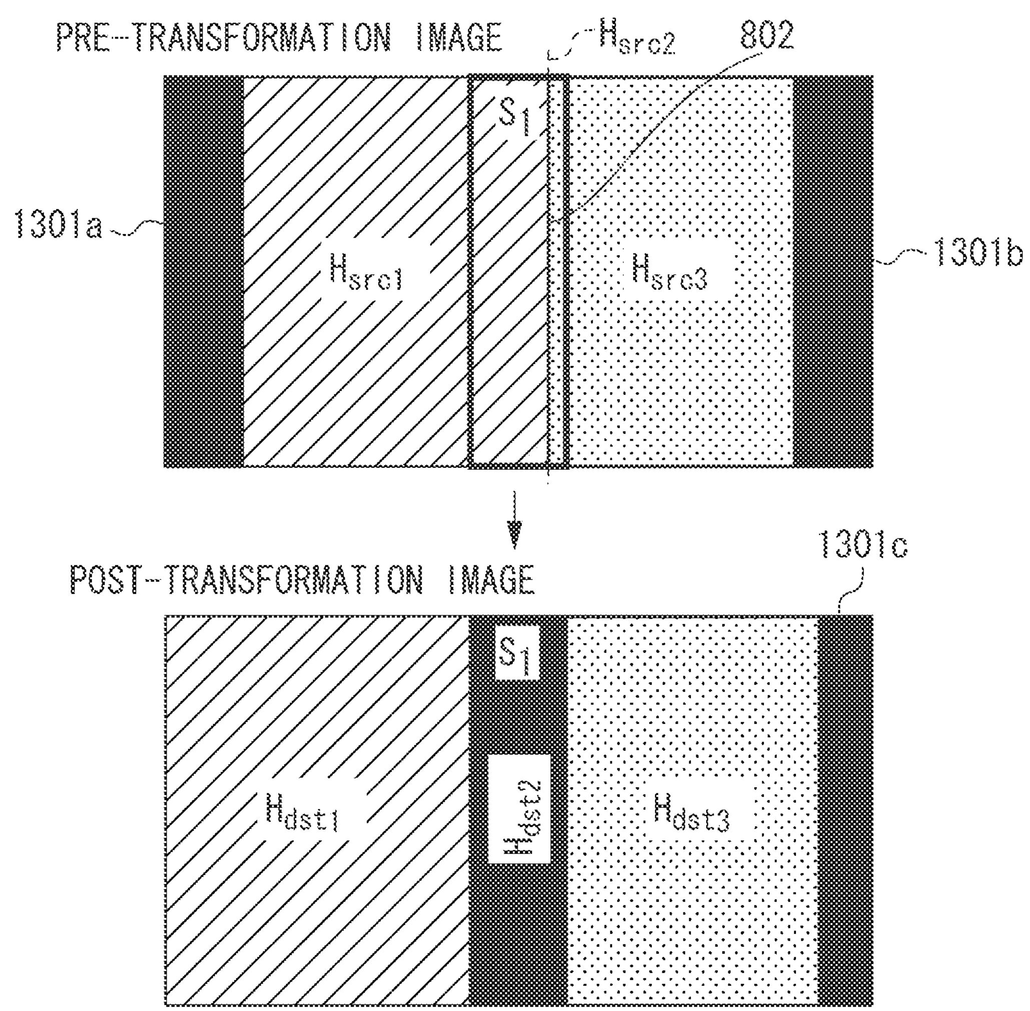

FIGS. 14A and 14B illustrate an example of the generation method for coordinate transformation operators in the case where black band areas are added to the left and right ends of an input image. Concretely, FIG. 14A illustrates characters in an input image and an unsuitable-for-projection area on which one of the characters is superimposed. FIG. 14B illustrates examples of a pre-transformation image and a post-transformation image.

In the example illustrated in FIG. 14A, as in the example in FIG. 8C, the character identified by the piece of character positional information $M_5$ overlaps the line segment 801 that equally divides the rectangle that forms the unsuitable-for-projection area having the coordinates $S_1$ into left and right portions. Therefore, as described above with reference to FIG. 8C, the values of the set of coordinates $H_{src2}$ of the pre-transformation four-corner points of the line segment that divides the input image are changed from the values of coordinates of the line segment 801 to the values of coordinates of the line segment 802.

At this time, the coordinate transformation operator generation unit 305 determines the set of coordinates $H_{dst1}$ of the post-transformation four-corner points by shifting the rectangle formed by the set of coordinates $H_{src1}$ of the pre-transformation four-corner points to the left by an amount permissible within the length (width) of the black band area 1301*a* in the horizontal direction. Likewise, the coordinate transformation operator generation unit 305 determines the set of coordinates $H_{dst3}$ of the post-transformation four-corner points by shifting the rectangle formed by the set of coordinates $H_{src3}$ of the pre-transformation four-corner points to the right by an amount permissible within the length (width) of the black band area 1301*b* in the horizontal direction.

In the example illustrated in FIG. 14B, as for the coordinate transformation operator based on the set of coordinates $H_{src1}$ of the pre-transformation four-corner points and the set of coordinates $H_{dst1}$ of the post-transformation four-corner points, an input image on the left side of the line segment 802 can be displayed so as to avoid the unsuitable-for-projection area merely by a move operation in the horizontal direction. Likewise, the coordinate transformation operator based on the set of coordinates $H_{src3}$ of the pre-transformation four-corner points and the set of coordinates $H_{dst3}$ of the post-transformation four-corner points, an input image on the right side of the line segment 802 can be displayed so as to avoid the unsuitable-for-projection area merely by the move operation in the horizontal direction.

Incidentally, in the example illustrated in FIG. 14B, the horizontal length of the black band area 1301*b* is longer than the amount of horizontal movement of the input image on the right side of the line segment 802. Therefore, a black band area 1301*c* is displayed on the right side of the image displayed in the rectangle represented by the set of coordinates $H_{dst3}$ of the post-transformation four-corner points (the input image on the right side of the line segment 802). On the other hand, the amount of horizontal movement of the input image on the left side of the line segment 802 is the same as the horizontal length of the black band area 1301*a*. Therefore, no black band area is displayed on the left side of the image displayed in the rectangle represented by the set of coordinates $H_{dst1}$ of the post-transformation four-corner points (the input image on the left side of the line segment 802).

In the case where the entire area of an input image cannot be displayed merely by the horizontal move operation as described above (in the case where the amount of horizontal movement of the input image is longer than the horizontal length of the black band area), the divided input images are reduced in size according to the difference between the amount of horizontal movement of the input image and the horizontal length of the black band area.

Further, in the case where there is not a black band area as described above, the above-described horizontal move operation without performance of size reduction of the image (i.e., the shifting of the rectangles formed by the set of coordinates $H_{src1}$ and $H_{src3}$ of the pre-transformation four-corner points to the left and right sides without reducing the rectangles in size) may also be performed. However, if such operation is performed, the size of the input image after being transformed is larger than the size of the input image before being transformed (in the example described above in conjunction with the exemplary embodiment, the image becomes longer in horizontal length by the amount corresponding to the unsuitable-for-projection area). Therefore, when the foregoing operation is to be performed, it suffices that a pattern image having the same size as the post-transformation input image is projected, and that it is checked that, in the projection area of the pattern image, the areas extending outside the pre-transformation input image do not have an unsuitable-for-projection area. The projection of a pattern image as described above does not need to be performed in the case where it is known beforehand that, in the projection area of the pattern image, the areas extending outside the pre-transformation input image do not have an unsuitable-for-projection area.

In the present exemplary embodiment, the exemplary case where the unsuitable-for-projection area 103 extending in a vertical direction exists has been described. However, the exemplary embodiment is also applicable in the case where an unsuitable-for-projection area extending in a horizontal direction exists. If there is a plurality of unsuitable-for-projection areas 103 extending in a single direction, it suffices that the processes described above in the present exemplary embodiments are performed separately for each unsuitable-for-projection area 103.

Also, the present exemplary embodiment is applicable even in the case where black band areas as illustrated in FIG. 13 are added along the upper and lower ends of an input image.

For such a case, the foregoing description can be applied merely by replacing the term "up-down" with "left-right", the term "left-right" with "up-down", the term "horizontal" with "vertical", and the term "vertical" with "horizontal".

In the case where an unsuitable-for-projection area in the vertical direction and an unsuitable-for-projection area in the horizontal direction coexist, it suffices that the process performed when the unsuitable-for-projection area in the horizontal direction exists and the process performed when the unsuitable-for-projection area in the vertical direction exists are combined. For example, firstly, the set of coordinates of the post-transformation four-corner points is obtained by performing the process arranged for the case where an unsuitable-for-projection area in the vertical direction exists. Then, the set of coordinates of the post-transformation four-corner points, handled as the set of coordinates of the pre-transformation four-corner points, is subjected to the process arranged for the case where an unsuitable-for-projection area in the horizontal direction exists, so that the set of coordinates of the four-corner points after being subjected to final transformation is obtained.

In the present exemplary embodiment, in the case where a configuration represented by the set of coordinates $H_{src2}$ of the pre-transformation four-corner points is a line segment, the coordinate transformation unit 306 sets a pixel value of the coordinates contained in a quadrangle represented by the set of coordinates $H_{dst2}$ of the post-transformation four-corner points to 0 (zero), that is, sets the pixels as black pixels. This allows an image to be viewed and an image to be projected on the unsuitable-for-projection area to be clearly distinguished, and is therefore preferable. However, this is not always needed, if an image different from the image to be viewed is displayed on the quadrangle represented by the set of coordinates $H_{dst2}$ of the post-transformation four-corner points. For example, this quadrangular area may be left without an image displayed, or the quadrangular area may be given a pixel value for predetermined patterns other than 0 (zero). For example, equal pixel values other than 0 (zero) may be given as the pixel values of the predetermined patterns, or pixel values of patterns made up of a plurality of pixel values clearly distinguishable from the image to be viewed may be given as the pixel values of the predetermined patterns. This applies in substantially the same manner to the black band areas illustrated in FIG. 13.

Further, in the present exemplary embodiment, the case where an unsuitable-for-projection area is detected from a result obtained by capturing a projected pattern image has been described. However, projecting and capturing a pattern image is not always needed, for example, in the case where the position of an unsuitable-for-projection area can be specifically determined from a geometrical relation between the video image projection apparatus 100 and the projection surface 101.

Incidentally, the foregoing exemplary embodiments are mere description of examples of reduction to embodiment in carrying out the present invention, and must not be used to construe the technical scope of the invention in any limitative manner. That is, the present invention can be carried out in various forms without departing from the technical spirit of the invention or its main features.

According to the foregoing exemplary embodiment, it is possible to inhibit an object contained in an image from becoming hard to be visually recognized when the image is divided and then projected in order to avoid an area on which a projected image is hard to be visually recognized.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)®, a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-007977 filed Jan. 20, 2014, which is hereby incorporated by reference herein in its entirety.

What is claimed is:

1. An image processing apparatus comprising:

a detecting unit configured to detect an object from an input image;

an identification unit configured to identify a non-object area on which the image projection unit is not caused to project the object; and a transformation unit configured to, in a case where the identification unit identifies a plurality of non-object areas, transform the input image so that the image projection unit does not project the object on any one of the plurality of non-object areas and that the object is not divided by any one of the plurality of non-object areas.

2. The image processing apparatus according to claim 1, wherein the detecting unit detects as the object at least one of a character and a human body through an image analysis processing performed on the input image.

3. The image processing apparatus according to claim 1, wherein the detecting unit detects as the object at least one of a character and a human body by an analysis process on the meta data of input image.

4. The image processing apparatus according to claim 1, wherein the transformation unit transforms the input image so that a black image is projected on each of the plurality of non-object areas, and reduces a size of the input image according to that of an area of the black image.

5. The image processing apparatus according to claim 1, wherein if an end of the input image contains a band-shaped black area, the transformation unit shifts the input image so that the object is not projected on the non-object area and that the object is not divided by the non-object area.

6. The image processing apparatus according to claim 1, further comprising:

a control unit configured to cause the image projection unit to project a predetermined pattern image; and an image capturing unit configured to capture a projection surface on which the predetermined pattern image is projected by the image projection unit, wherein the identification unit identifies the non-object area from the captured image obtained by the image capturing unit, based on a position at which the predetermined pattern image is not detected.

7. The image processing apparatus according to claim 6, wherein the predetermined pattern image is an image in which predetermined graphics are disposed at predetermined intervals.

8. The image processing apparatus according to claim 6, further comprising a correction unit configured to execute a distortion correction process on the predetermined pattern image, wherein the image capturing unit captures the projection surface on which the distortion correction-processed pattern image is projected, and the identification unit identifies the non-object area from the captured image obtained by the image capturing unit, based on the position at which the predetermined pattern image is not detected.

9. An image processing method comprising:

detecting an object from an input image;

identifying a non-object area on which the image projection unit is not caused to project the object; and transforming, in a case where the identifying identifies a plurality of non-object areas, the input image so that the image projection unit does not project the object on any one of the plurality of non-object areas and that the object is not divided by any one of the plurality of non-object areas.

10. A non-transitory computer-readable medium storing a program for causing a computer to execute a method comprising:

detecting an object from an input image;

identifying a non-object area on which the image projection unit is not caused to project the object; and transforming, in a case where the identifying identifies a plurality of non-object areas, the input image so that the image projection unit does not project the object on any one of the plurality of non-object areas and that the object is not divided by any one of the plurality of non-object areas.

* * * * *